United States Patent
Chen et al.

(10) Patent No.: US 10,054,809 B2
(45) Date of Patent: Aug. 21, 2018

(54) LIQUID CRYSTAL DISPLAY DEVICE

(71) Applicant: WUHAN CHINA STAR OPTOELECTRONICS TECHNOLOGY CO., LTD., Wuhan (CN)

(72) Inventors: Shihhsiang Chen, Wuhan (CN); Pengbo Xu, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 25 days.

(21) Appl. No.: 15/113,745

(22) PCT Filed: Mar. 31, 2016

(86) PCT No.: PCT/CN2016/077999
§ 371 (c)(1),
(2) Date: Jul. 22, 2016

(87) PCT Pub. No.: WO2017/140013
PCT Pub. Date: Aug. 24, 2017

(65) Prior Publication Data
US 2017/0371196 A1     Dec. 28, 2017

(30) Foreign Application Priority Data

Feb. 19, 2016   (CN) .......................... 2016 1 0093861

(51) Int. Cl.
*G02F 1/1333* (2006.01)
*G02F 1/1335* (2006.01)

(52) U.S. Cl.
CPC .. *G02F 1/133308* (2013.01); *G02F 1/133608* (2013.01); *G02F 2001/133314* (2013.01)

(58) Field of Classification Search
CPC ......... G02F 1/133308; G02F 1/133608; G02F 2001/133314; B33Y 80/00
See application file for complete search history.

(56) References Cited

U.S. PATENT DOCUMENTS

| | | | |
|---|---|---|---|
| 8,031,290 B2 | 10/2011 | Fu | |
| 9,720,270 B2 | 8/2017 | Murakami | |
| 2013/0070179 A1* | 3/2013 | Kim | G02F 1/133512 349/58 |
| 2014/0307469 A9* | 10/2014 | Ozawa | G02B 6/0031 362/609 |
| 2016/0131830 A1 | 5/2016 | Gettemy et al. | |
| 2016/0363804 A1* | 12/2016 | Son | G02F 1/133308 |
| 2017/0167697 A1* | 6/2017 | Stevenson | F21K 9/64 |

FOREIGN PATENT DOCUMENTS

| | | |
|---|---|---|
| CN | 101256299 A | 9/2008 |
| CN | 103782091 A | 5/2014 |
| CN | 104903783 A | 9/2015 |
| CN | 104965334 A | 10/2015 |

* cited by examiner

*Primary Examiner* — Nathanael R Briggs
(74) *Attorney, Agent, or Firm* — Muncy, Geissler, Olds & Lowe, P.C.

(57) ABSTRACT

A liquid crystal display device is provided. The liquid crystal display device includes a plastic frame, used to install a liquid crystal display panel. A color of the plastic frame changes from white to black, from a side close to the liquid crystal layer to a side far from the liquid crystal layer, to prevent light leaking. The color of the plastic frame changes gradually from white to black from inside to outside, so as to reduce a thickness of the plastic frame while preventing light leaking.

12 Claims, 2 Drawing Sheets

LIQUID CRYSTAL DISPLAY DEVICE

FIELD OF THE INVENTION

The present invention relates to the display technology field, and particularly to a liquid crystal display device.

BACKGROUND OF THE INVENTION

Current liquid crystal display devices often use white material for forming plastic frames thereof; as a wall of the plastic frame becomes thinner and thinner, the formation of the plastic frame by the white material makes the light possibly penetrate the wall of the plastic frame, resulting in light leaking.

In the existing method for solving light leaking, as shown in FIG. 1, a black tape 12 is attached to the outermost side of the plastic frame 11 to prevent light leaking, but the method can change a size of a module, and thus increase the production cost. In addition, the current process of a dual-color plastic frame actually needs to form a plastic frame of a color in a mold first, and then put the single-color plastic frame to another mold, and form a plastic frame of another color again; each process needs a thickness of a least 0.4 mm to make sure that the plastic frame can be formed, resulting in the whole thickness being at least 0.8 mm; that is, the frame is thicker, and unable to satisfy a requirement of a narrow frame.

Therefore, it is necessary to provide a liquid crystal display device in order to solve the problem existing in the prior art.

SUMMARY OF THE INVENTION

The present invention aims to provide a liquid crystal display device, in order to solve the technical problems that light leaking easily happens in the existing liquid crystal display device, the thickness of the plastic frame is thicker, and the requirement of a simple process in the formation of the plastic frame cannot be satisfied.

To solve the aforementioned technical problem, the present invention constructs a liquid crystal display device including: a liquid crystal display panel; the liquid crystal display panel includes a first substrate including a data line and a scan line, and a pixel unit located between the data line and the scan line; a second substrate, disposed opposite the first substrate, includes a common electrode; a liquid crystal layer is located between the first substrate and the second substrate; and a plastic frame is used for installing the liquid crystal display panel. A color of the plastic frame changes from white to black, from a side close to the liquid crystal layer to a side far from the liquid crystal layer, to prevent light leaking. The plastic frame is obtained by a 3D printing process, and a thickness of the plastic frame is smaller than or equal to 0.4 millimeters.

In the liquid crystal display device of the present invention, the plastic frame includes a plurality of sub plastic frame layers; a thickness of each of the sub plastic frame layers is the same.

In the liquid crystal display device of the present invention, the plastic frame includes a plurality of sub plastic frame layers, and a difference between thicknesses of adjacent two sub plastic frame layers is the same.

In the liquid crystal display device of the present invention, the plastic frame includes a plurality of sub plastic frame layers, and a difference between gray level values of adjacent two of the sub plastic frame layers is the same.

In the liquid crystal display device of the present invention, the plastic frame includes a plurality of sub plastic frame layers, and a thickness of a sub plastic frame layer closest to the liquid crystal layer, and a thickness of a sub plastic frame layer farthest from the liquid crystal layer are both larger than a thickness of the rest of the sub plastic frame layers.

In the liquid crystal display device of the present invention, a material of the plastic frame is plastic.

In the liquid crystal display device of the present invention, the first substrate is an array substrate, and the second substrate is a color film substrate.

In the liquid crystal display device of the present invention, the liquid crystal display device further comprises a backlight module, the backlight module being located below the plastic frame.

To solve the aforementioned technical problem, the present invention constructs a liquid crystal display device, including: a liquid crystal display panel, the liquid crystal display panel including: a first substrate, including a data line and a scan line, and a pixel unit located the data line and the scan line; a second substrate, disposed opposite to the first substrate, the second substrate including a common electrode; and a liquid crystal layer, located between the first substrate and the second substrate; and a plastic frame, used for installing the liquid crystal display panel. A color of the plastic frame changes from white to black, from a side close to the liquid crystal layer to a side far from the liquid crystal layer, to prevent light leaking.

In the liquid crystal display device of the present invention, the plastic frame includes a plurality of sub plastic frame layers, a thickness of each of the sub plastic frame layers is the same.

In the liquid crystal display device of the present invention, the plastic frame includes a plurality of sub plastic frame layers, a difference between thicknesses of adjacent two of the sub plastic frame layers is the same.

In the liquid crystal display device of the present invention, the plastic frame includes a plurality of sub plastic frame layers, a difference between gray level values of adjacent two of the sub plastic frame layers is the same.

In the liquid crystal display device of the present invention, the plastic frame includes a plurality of sub plastic frame layers, a thickness of a sub plastic frame layer closest to the liquid crystal layer, and a thickness of a sub plastic frame layer farthest from the liquid crystal layer are both larger than a thickness of the rest of the sub plastic frame layers.

The liquid crystal display device of the present invention, a thickness of the plastic frame is less than or equal to 0.4 millimeters.

The liquid crystal display device of the present invention, the plastic frame is obtained by 3D printing technology process.

The liquid crystal display device of the present invention, a material of the plastic frame is plastic.

The liquid crystal display device of the present invention, the first substrate is an array substrate, the second substrate is a color film substrate.

The liquid crystal display device of the present invention, the liquid crystal display device further includes a backlight module, the backlight module being located below the plastic frame.

The color of the plastic frame of the liquid crystal display device of the present invention changes gradually from white to black from inside to outside, that is, the light can be reflected from the white color, and the penetrating light can be absorbed in the plastic frame by the black part outside, so as to reduce the thickness of the plastic frame while preventing light leaking.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF THE PREFERRED EMBODIMENTS

Figure 1:
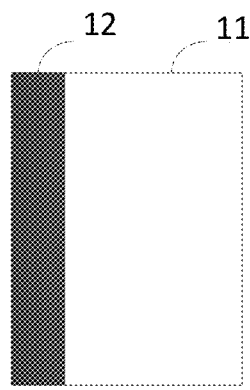
FIG. 1 illustrates a structural diagram of the plastic frame of the prior art.

As used in this specification the term "embodiment" means that instance, an example, or illustration. In addition, for the articles in this specification and the appended claims, "a" or "an" in general can be interpreted as "one or more" unless specified otherwise or clear from context to determine the singular form.

In the drawings, the same reference numerals denote units with similar structures.

Figure 2:
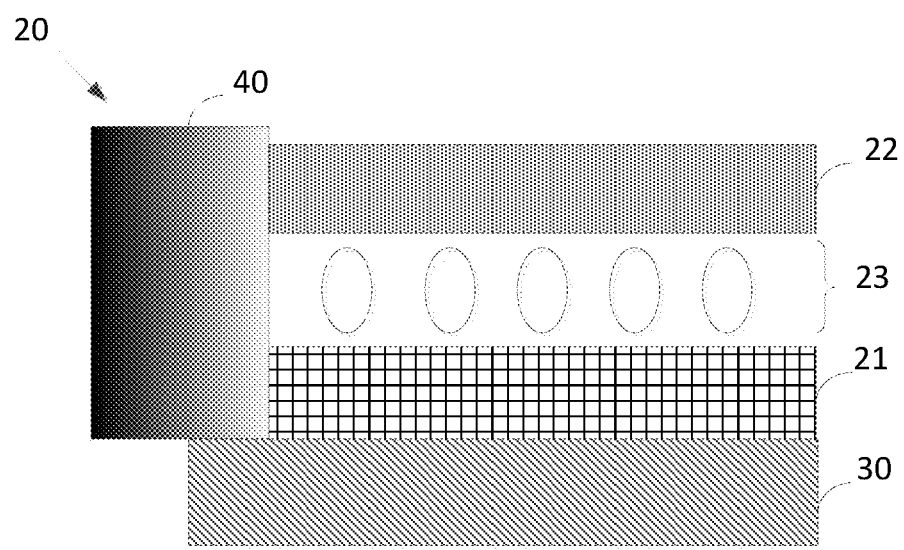
FIG. 2 illustrates a structural diagram of a first type of the liquid crystal display device of the present invention.

Please refer to FIG. 2, FIG. 2 illustrates a structural diagram of a first type of the liquid crystal display device of the present invention;

The liquid crystal display device 20 of the present invention includes a liquid crystal display panel and a plastic frame 40; the liquid crystal display panel includes a first substrate 21, a second substrate 22, and a liquid crystal layer 23 located between the first and second substrates 21, 22. Preferably, the liquid crystal display device 20 may further include a backlight module 30. The backlight module 30 is located below the plastic frame 40. A material of the plastic frame 40 may be plastic.

The first substrate 21 may include a data line and scan line, and a pixel unit formed between the data line and the scan line. The second substrate 22 and the first substrate 21 are disposed opposite to each other. The second substrate 22 includes a common electrode and a black matrix. The first substrate 21 may be an array substrate, and the second substrate 22 may be a color film substrate. Surely, the first substrate 21 may also be a COA (color filter on arrays) substrate. A plastic frame 40 is used for installing the liquid crystal display panel. A color of the plastic frame 40 changes from white to black, from a side close to the liquid crystal layer to a side far from the liquid crystal layer, that is, changing the color of the plastic frame from white to black from inside to outside. The plastic frame 40 may extend all over a periphery of the liquid crystal display panel.

Because the light of the liquid crystal display panel can be reflected by white color, and the light penetrating the white part is gradually absorbed by the plastic frame with dark color; thus light leaking is prevented well, the process of disposing the black tape outside the plastic frame is saved, and the production cost is saved.

In the liquid crystal display device of the present invention, the light can be reflected from the white color inside by changing the color of the plastic frame gradually from white to black from inside to outside, and while the penetrating light is absorbed in the plastic frame by the black part outside, the thickness of the plastic frame is reduced.

Figure 3:
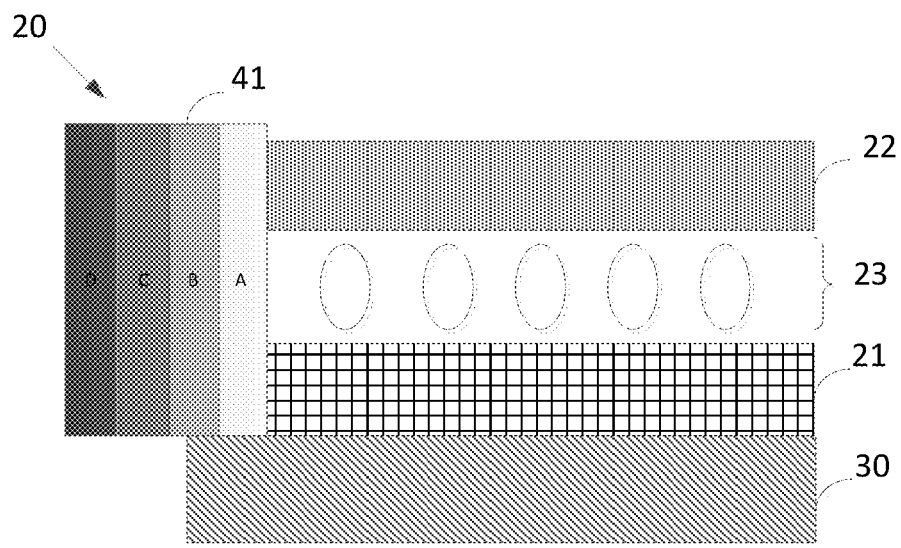
FIG. 3 illustrates a structural diagram of a second type of the liquid crystal display device of the present invention.

Please refer to FIG. 3, which illustrates a structural diagram of a second type of the liquid crystal display device of the present invention.

The liquid crystal display device 20 of the present invention includes a liquid crystal display panel and plastic frame 41. The liquid crystal display panel includes a first substrate 21, a second substrate 22, and a liquid crystal layer 23 located between the first and second substrates 21, 22.

The first substrate 21 may include a data line and scan line, and a pixel unit located between the data line and the scan line. The second substrate 22 and the first substrate 21 are disposed opposite to each other. The second substrate 22 includes a common electrode. The first substrate 21 may be an array substrate, the second substrate 22 may be a color film substrate. Surely, the first substrate 21 may also be a COA (color filter on arrays) substrate. A plastic frame 41 is used to install the liquid crystal display panel.

A color of the plastic frame 41 changes from white to black, from a side close to the liquid crystal layer to a side far from the liquid crystal layer, that is, changing the color of the plastic frame from white to black from inside to outside.

Preferably, the liquid crystal display device 20 may further include a backlight module 30. The backlight module 30 is located below the plastic frame 41. A material of the plastic frame 41 may be plastic.

Preferably, the plastic frame 41 may be a multi-layer structure, for example, by 3D printing technology process. Each layer obtains a plastic frame of a different color, as shown in FIG. 3; the plastic frame 41 includes a plurality of sub plastic frame layers A-D; the thickness of each sub plastic frame layer is the same. That is, the thickness of each sub plastic frame layer is the same, because the thickness of each sub plastic frame layer is disposed to be the same value, thus the efficiency of the process is increased, in this way, the process is convenient.

Optionally, a difference between thickness of adjacent two sub plastic frame layers is the same. For example, the difference between thickness of adjacent two sub plastic frame layers A and B equals to the difference between thickness of adjacent two sub plastic frame layers B and C, and the difference between thickness of adjacent two sub plastic frame layers C and D. For example, the thickness of the sub plastic frame layer is increased according to a fixed increment value by 3D printing technology process, thus the efficiency of the process in increased.

Preferably, a difference between gray level values of adjacent two sub plastic frame layers is the same. For example, the difference between gray level values of adjacent two sub plastic frame layers A and B equals to the difference between gray level values of adjacent two sub plastic frame layers B and C, and the difference between gray level values of adjacent two sub plastic frame layers C and D. That is, the colors of the sub plastic frame layers are increased from the sub plastic frame layer inside to the sub plastic frame layer outside according to a fixed gray level value, so as to further increase the effect of light absorption, and better prevent light leaking.

Optionally, a thickness of a sub plastic frame layer closest to the liquid crystal layer 23, and a thickness of a sub plastic frame layer farthest from the liquid crystal layer 23 are both greater than a thickness of the rest of sub plastic frame layers. For example, thickness of the sub plastic frame layer A and the sub plastic frame layer D are greater than thickness of sub plastic frame layers B and C.

That is, the thickness of the innermost sub plastic frame layer and the outermost sub plastic frame layer are greater than the thickness of the middle layer, so as to reflect the light better while absorbing the light. Preferably, the thickness of the sub plastic frame layers between the innermost and the outermost sub plastic frame layers are the same.

Preferably, the thickness of the plastic frame 41 is less than or equal to 0.4 millimeters, so as to be advantageous for the liquid crystal display device of the narrow frame process.

Preferably, the plastic frame 41 is obtained by 3D printing technology process.

The liquid crystal display device of the present invention changes the color of the plastic frame gradually from white to black from inside to outside, and further manufactures the plastic frame as a multi-layer structure, so as to better prevent light leaking, and increase the efficiency of the process.

In summary, although the present invention has been described in preferred embodiments above, the preferred embodiments described above are not intended to limit the invention. Persons skilled in the art, without departing from the spirit and scope of the invention otherwise, may be used for a variety modifications and variations, so the scope of the invention as defined by the claims prevails.

What is claimed is:

1. A liquid crystal display device, comprising:
   a liquid crystal display panel, comprising:
   a first substrate;
   a second substrate, disposed opposite the first substrate; and
   a liquid crystal layer, located between the first substrate and the second substrate; and
   a plastic frame, used for installing the liquid crystal display panel;
   wherein the plastic frame is a single-block structure, and
   wherein a color of the plastic frame gradually changes from white to black, from a side close to the liquid crystal layer to a side far from the liquid crystal layer, to prevent light leaking, wherein the plastic frame is obtained by 3D printing technology process, and a thickness of the plastic frame is less than or equal to 0.4 millimeters.

2. The liquid crystal display device of claim 1, wherein a material of the plastic frame is plastic.

3. The liquid crystal display device of claim 1, wherein the first substrate is an array substrate, the second substrate is a color film substrate.

4. The liquid crystal display device of claim 1, wherein the liquid crystal display device further comprises a backlight module, the backlight module located below the plastic frame.

5. A liquid crystal display device, comprising:
   a liquid crystal display panel, comprising:
   a first substrate;
   a second substrate, disposed opposite the first substrate; and
   a liquid crystal layer, located between the first substrate and the second substrate; and
   a plastic frame, used for installing the liquid crystal display panel;
   wherein the plastic frame includes at least three sub plastic frame layers, and each of the sub plastic frame layers has one homogeneous color,
   wherein a color of the plastic frame changes from white to black, from a side close to the liquid crystal layer to a side far from the liquid crystal layer, to prevent light leaking, and
   wherein the plastic frame is obtained by 3D printing technology process, and a thickness of the plastic frame is less than or equal to 0.4 millimeters.

6. The liquid crystal display device of claim 5, wherein a thickness of each of the sub plastic frame layers is the same.

7. The liquid crystal display device of claim 5, wherein a difference between thicknesses of adjacent two of the sub plastic frame layers is the same.

8. The liquid crystal display device of claim 5, wherein a difference between gray level values of adjacent two of the sub plastic frame layers is the same.

9. The liquid crystal display device of claim 5, wherein a thickness of a sub plastic frame layer closest to the liquid crystal layer, and a thickness of a sub plastic frame layer farthest from the liquid crystal layer are both greater than a thickness of the rest of sub plastic frame layers.

10. The liquid crystal display device of claim 5, wherein a material of the plastic frame is plastic.

11. The liquid crystal display device of claim 5, wherein the first substrate is an array substrate, the second substrate is a color film substrate.

12. The liquid crystal display device of claim 5, wherein the liquid crystal display device further comprises a backlight module, the backlight module located below the plastic frame.

* * * * *